US010677119B2

(12) United States Patent
Shaull et al.

(10) Patent No.: US 10,677,119 B2
(45) Date of Patent: Jun. 9, 2020

(54) SYSTEMS AND METHODS FOR REDUCING THE OIL VOLUME AND WINDAGE IN FUEL PUMPS

(71) Applicant: CUMMINS INC., Columbus, IN (US)

(72) Inventors: Anthony A. Shaull, Columbus, IN (US); Rodney J. Hemmerlein, Columbus, IN (US); Richard Davis Thomas, Columbus, IN (US)

(73) Assignee: Cummins Inc., Columbus, IN (US)

(*) Notice: Subject to any disclaimer, the term of this patent is extended or adjusted under 35 U.S.C. 154(b) by 20 days.

(21) Appl. No.: 15/057,659

(22) Filed: Mar. 1, 2016

(65) Prior Publication Data

US 2017/0254237 A1 Sep. 7, 2017

(51) Int. Cl.
| F01M 9/10 | (2006.01) |
| F04B 53/18 | (2006.01) |
| F04B 1/02 | (2006.01) |
| F04B 9/04 | (2006.01) |
| F16H 53/02 | (2006.01) |

(52) U.S. Cl.
CPC .......... *F01M 9/10* (2013.01); *F04B 1/02* (2013.01); *F04B 9/042* (2013.01); *F04B 53/18* (2013.01); *F16H 53/025* (2013.01)

(58) Field of Classification Search
CPC .................. F01M 9/10; F16H 53/025
See application file for complete search history.

(56) References Cited

U.S. PATENT DOCUMENTS

| 192,567 A | * | 7/1877 | Cochrane .............. F16H 53/025 144/218 |
| 5,238,310 A | * | 8/1993 | Layfield ................ F16C 23/045 384/145 |
| 6,591,713 B2 | | 7/2003 | Jesel |
| 8,083,504 B2 | | 12/2011 | Williams et al. |
| 8,302,577 B2 | | 11/2012 | Wunsch et al. |
| 2006/0102132 A1 | | 5/2006 | Johnson |
| 2015/0300216 A1* | | 10/2015 | Wedel ................ F01L 13/0036 123/90.18 |
| 2015/0361976 A1 | | 12/2015 | Lai |

FOREIGN PATENT DOCUMENTS

| CN | 203271978 | 11/2013 |
| DE | 10 2010 055 189 | 6/2012 |
| DE | 10 2012 219 537 | 4/2014 |
| DE | 10 2013 212 047 | 1/2015 |
| EP | 0 742 351 | 11/1996 |
| EP | 1 544 462 | 6/2005 |
| JP | 8-21211 | 1/1996 |
| WO | 2010/046952 | 4/2010 |

OTHER PUBLICATIONS

Search Report dated Jul. 12, 2017 in corresponding European Application No. 17158674.6.

* cited by examiner

Primary Examiner — Vicky A Johnson
(74) Attorney, Agent, or Firm — Faegre Drinker Biddle & Reath LLP

(57) ABSTRACT

Systems and methods including spacers comprising a first face configured to engage with a cam shaft, a second face, and a third face operationally coupled to the first face and the second face, wherein the third face is configured to displace a lubricating fluid and permit rotation of the cam shaft are disclosed.

19 Claims, 7 Drawing Sheets

SYSTEMS AND METHODS FOR REDUCING THE OIL VOLUME AND WINDAGE IN FUEL PUMPS

FIELD OF THE DISCLOSURE

This disclosure relates to systems and methods for reducing oil volume and windage in fuel pumps. More specifically, this disclosure relates to spacers for reducing oil volume and windage in fuel pumps.

BACKGROUND

Fuel pumps, such as those used in high pressure common rail systems, typically use a fluid, such as oil or fuel for lubrication. Many conventional fuel pumps use cam shafts to drive pistons to provide pressure to the fuel system (e.g., high pressure fuel rails).

Many of the conventional fuel pumps have various voids between the cam shaft and the pump housing (e.g., the cam shaft lobes). In many instances, the voids may contain oil used to lubricate the moving parts of the fuel pump and aid in heat dissipation.

Often, the volume of lubricating fluid may cause additional work to be performed because the oil may begin to move due to proximity to the cam shaft, which may be rotating. The rotation or movement of the lubricating fluid, or windage, may increase the amount of work required for the fuel pump and, thus, is a source of parasitic power loss in many conventional fuel systems.

A need therefore exists to address issues of reducing the oil volume and windage in conventional and future fuel systems.

SUMMARY

In some embodiments, spacers may include a first face configured to engage with a cam shaft, a second face, and a third face operationally coupled to the first face and the second face, wherein the third face is configured to displace a lubricating fluid and permit rotation of the cam shaft.

In various embodiments, methods of manufacture may include disposing a lubricating fluid displacer circumferentially around a portion of a cam shaft, and securing a spacer to the cam shaft.

Also disclose are various embodiments of spacers including a first face, a second face, a third face operationally coupled to the first face and the second face, means for securing the spacer to a cam shaft, and means for permitting rotation of the cam shaft while allowing for displacement of a fluid in contact with the cam shaft.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Figure 1:
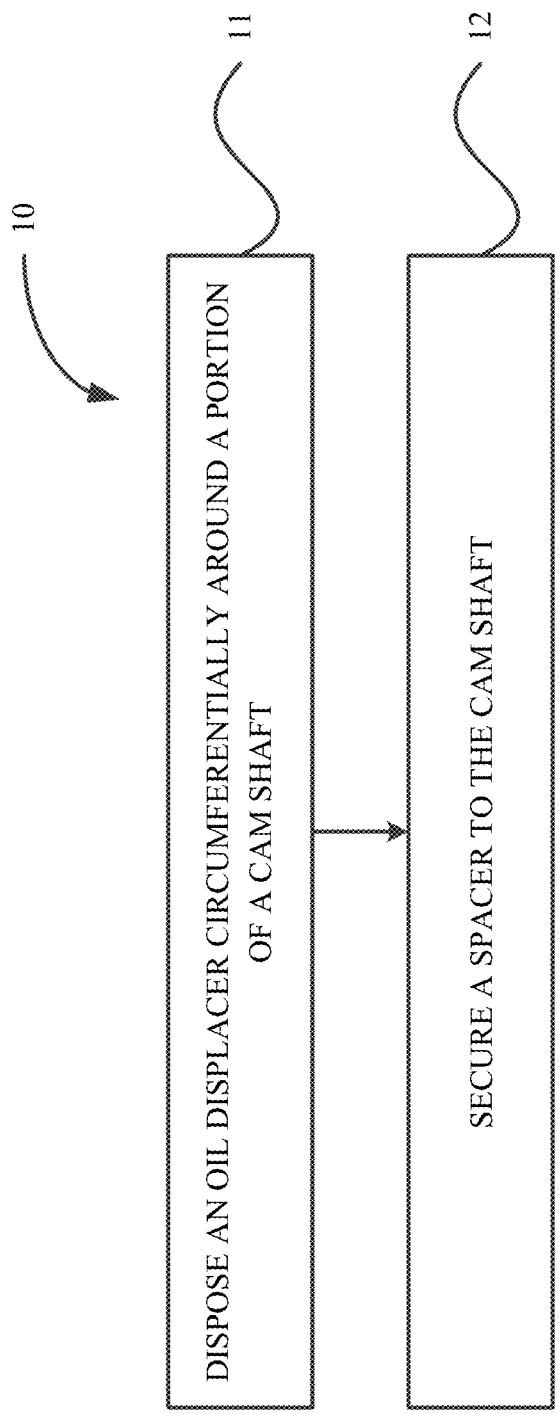
FIG. 1 illustrates a method of manufacturing a camshaft with spacers according to various embodiments.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION

The embodiments disclosed herein are not intended to be exhaustive or limit the disclosure to the precise form disclosed in the following detailed description. Rather, the embodiments are chosen and described so that others skilled in the art may utilize the teachings of the present disclosure.

FIG. 1 illustrates a method of manufacturing a cam shaft (such as cam shaft 110 in FIG. 2) with spacers according to various embodiments. As shown in FIG. 1, method 10 may comprise disposing an oil displacer circumferentially around a portion of a cam shaft (step 11) and securing a spacer to the cam shaft (step 12).

Method 10 is not particularly limited and may include any method capable of securing the spacer to the cam shaft. For example, the securing of the spacer may be accomplished by bonding the spacer to the cam shaft, by placing a spacer pin into a spacer pin port of the cam shaft, by disposing a band circumferentially around a portion of the spacer and securing the band, or combinations thereof.

Figure 6:
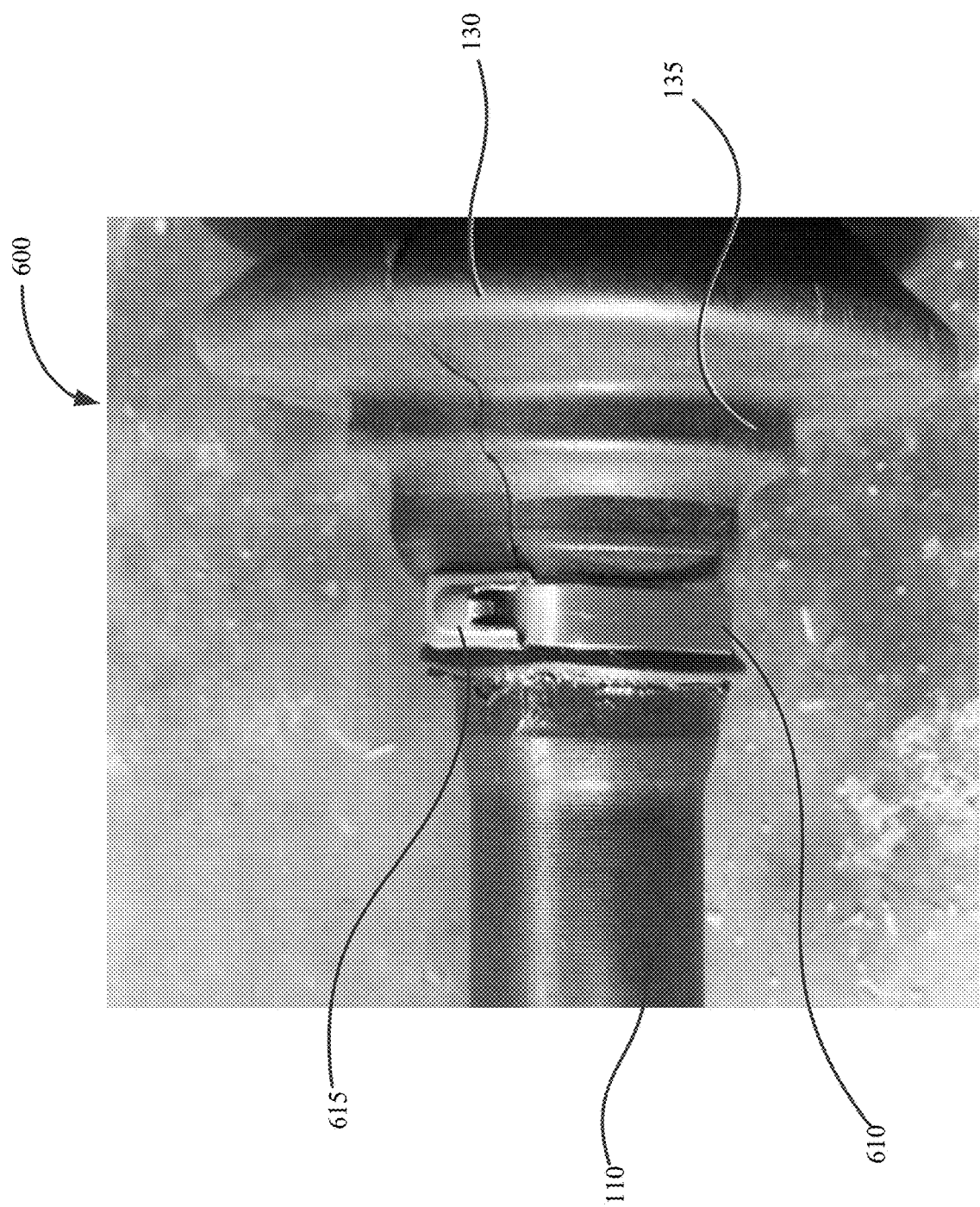
FIG. 6 is a perspective view of a spacer engaged with a cam shaft with a band and locking tab according to various embodiments.

Moreover, method 10 may include any of the spacers disclosed herein, such as those comprised of a plastic, such as the spacer illustrated in FIG. 6 and discussed in further detail herein.

Figure 2:
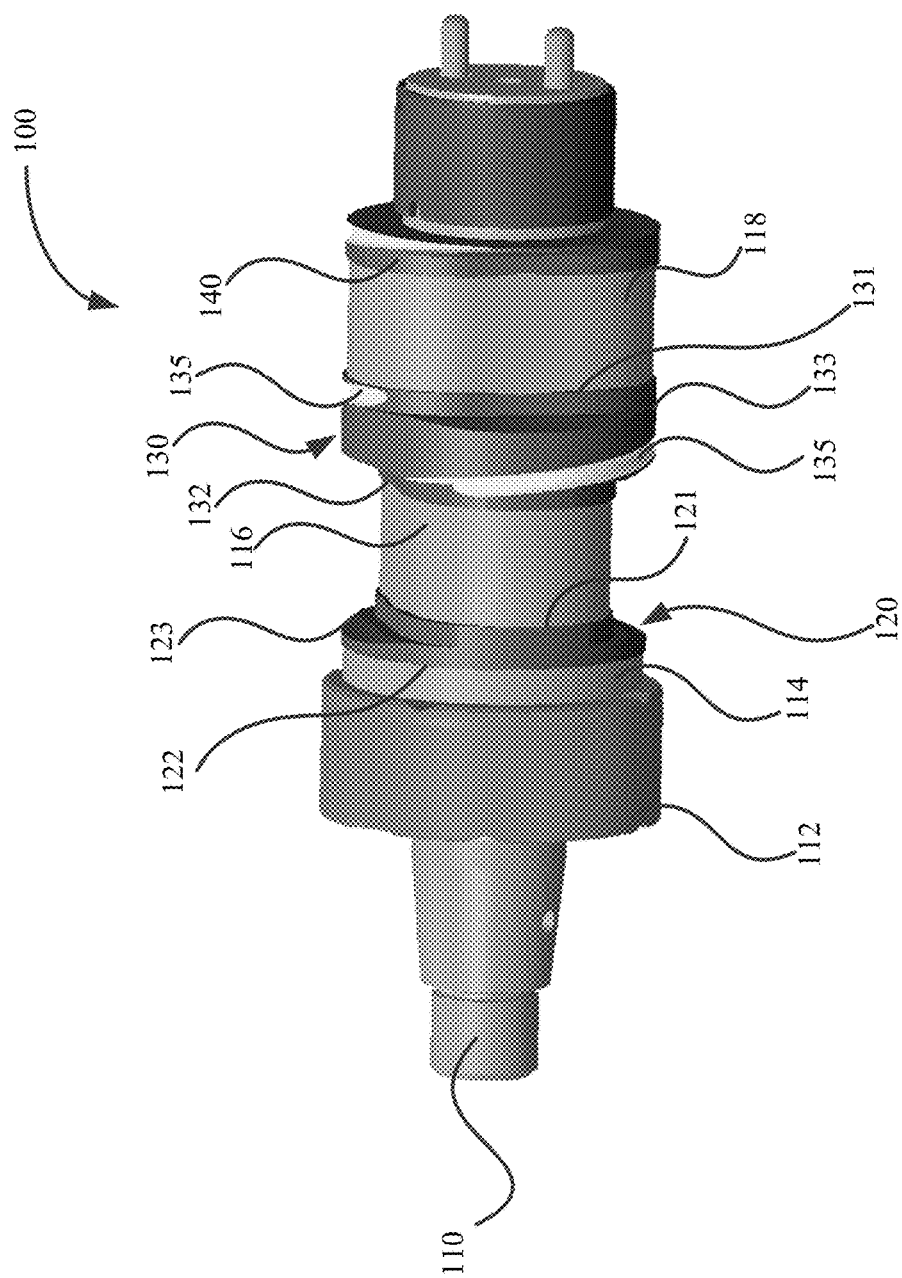
FIG. 2 is a perspective view of a cam shaft with a spacer according to various embodiments.

FIG. 2 illustrates a cam shaft 110 with various spacers engaged with the cam shaft 110 according to various embodiments. The modified cam shaft system 100 may comprise a cam shaft 110, which may include cam shaft lobes 116 and 118, bearing holder 112, and cam journal 114. FIG. 2 illustrates a cam shaft 110 with three spacers (spacers 120, 130, and 140) according to various embodiments. The spacers disclosed herein, may include a first face (e.g., 121 or 131) configured to engage with a cam shaft 110, a second face (e.g., 122 or 132), and a third face (e.g., 123 or 133) operationally coupled to the first face (e.g., 121 or 131) and the second face (e.g., 122 or 132), wherein the third face (e.g., 123 or 133) is configured to displace a motor oil and permit rotation of the cam shaft 110. As used herein, the term operationally coupled may include any configuration where the third face is operationally linked or joined with the first and second face while allowing for the displacement of a lubricating fluid while the cam shaft rotates.

For example, spacers 120 and 130 have a first face (121 and 131) and a second face (122 and 132) respectively. Spacers 120 and 130 also include a third face (123 and 133 respectively) connected to the first face (121 and 131 respectively) and the second face (122 and 132 respectively). The third face (123 and 133 respectively) may be structured with the first face (121 and 131 respectively) and the second face (122 and 132 respectively), to form a volume around the cam shaft 110 and, thus, displace a lubricating fluid while allowing for rotation of the cam shaft 110 during operation of the fuel pump.

Figure 3:
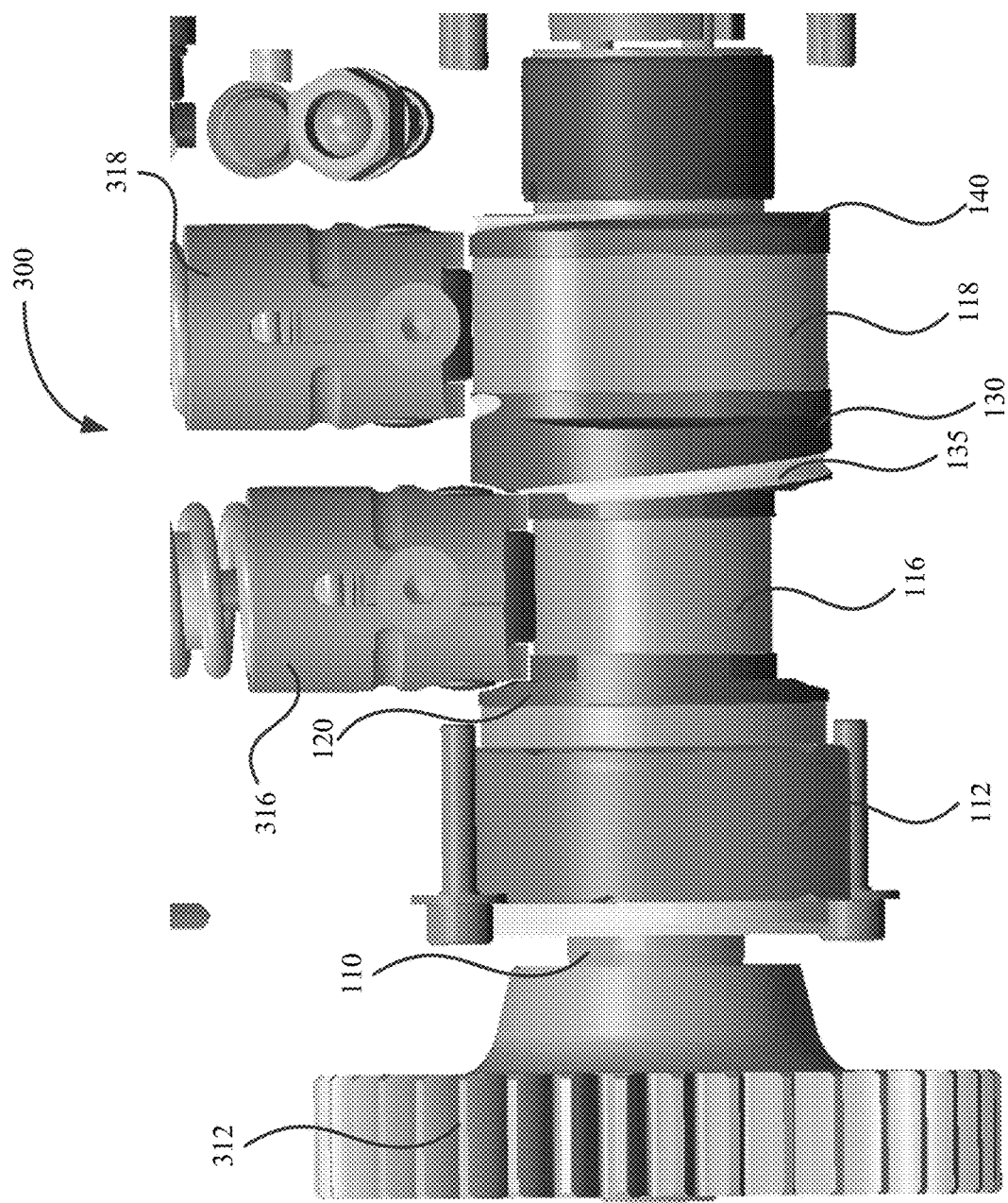
FIG. 3 is a side view of a fuel pump with a spacer according to various embodiments.

For example, FIG. 3 illustrates a portion of fuel pump 300 with plungers 316 and 318 and timing sprocket 312. As can be seen in FIG. 3, spacers 120, 130, and 140 allow for lobes 116 and 118 to rotate while engaged with plungers 316 and 318 respectively.

In other words, the volume of the spacers engaged with (e.g., coupled to) to the cam shaft 110 may displace reservoirs of lubricating liquid that would otherwise fill voids present in the absence of the spacers. Because the spacers displace significant amounts of lubricating fluid present in these voids, cam shafts with spacers will experience a significant reduction in parasitic power loss due to movement of lubricating liquid in proximity to the cam shaft.

The spacers may be used with a variety of cam shafts, such as cam shafts used in fuel pumps to help displace oil and reduce oil windage and, thus, reduce parasitic power loss. The locations of the spacers are not particularly limited and may include oil located between two lobes 116, 118 of the cam shaft 110, for example as shown with spacer 130.

Figure 4:
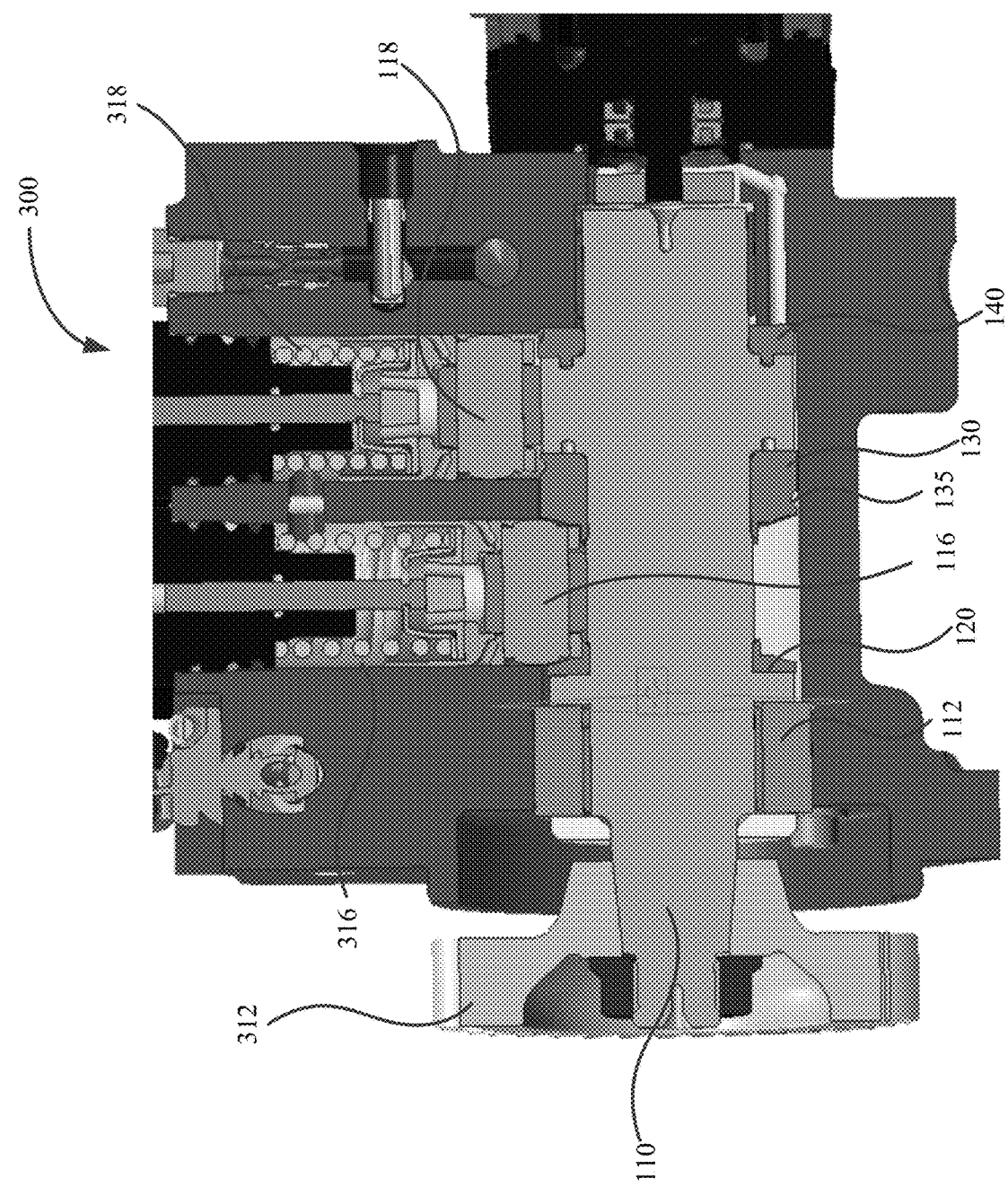
FIG. 4 is cross-sectional view of a fuel pump with a spacer according to various embodiments.
Figure 5:
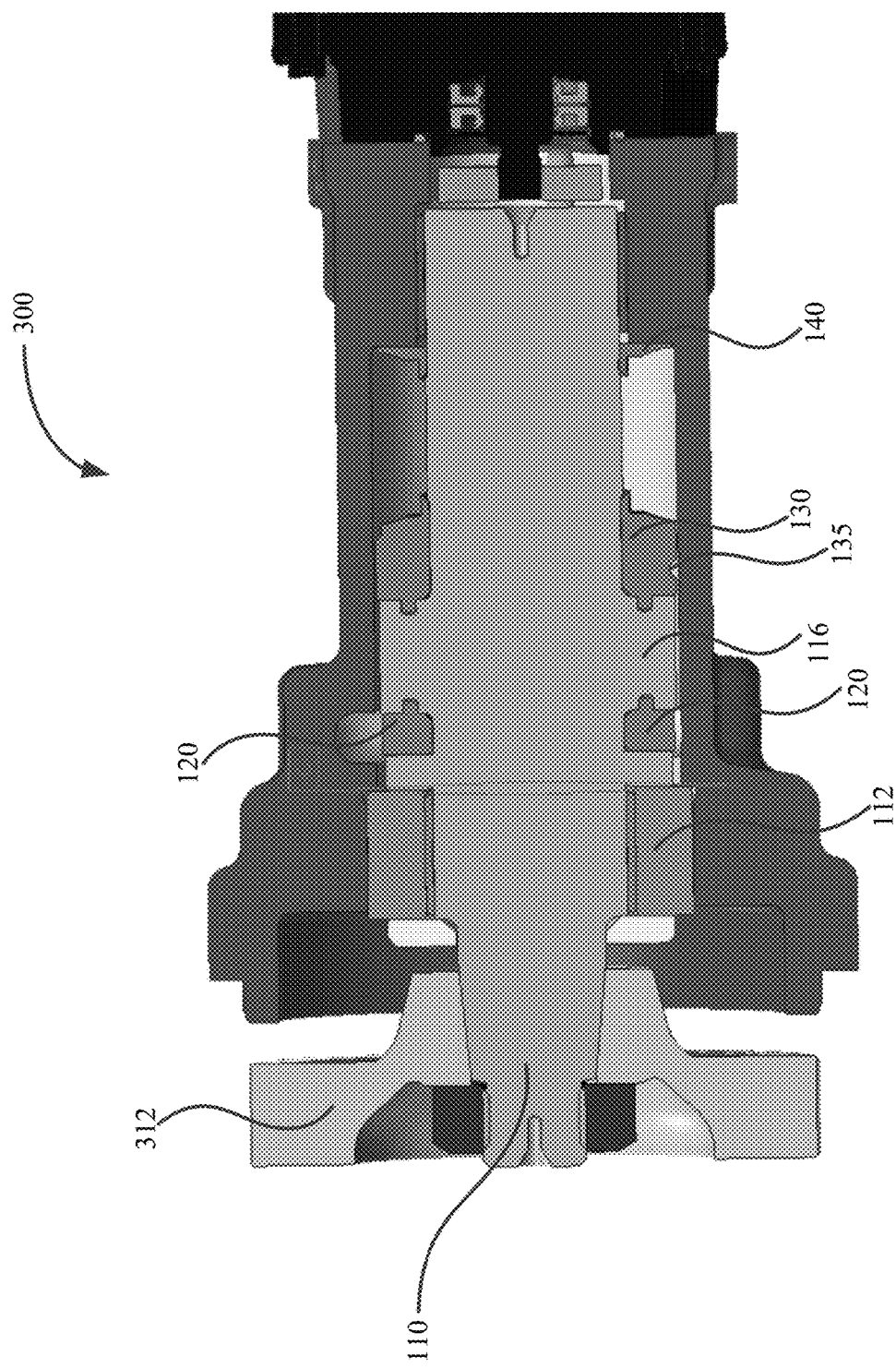
FIG. 5 is another cross-sectional view of a fuel pump with a spacer according to various embodiments.

For example, with reference to FIGS. 4 and 5, FIG. 4 illustrates a cross-sectional side view of a camshaft 110 with spacers 120, 130 and 140, while FIG. 5 illustrates a cross-sectional top view of a camshaft with spacers 120, 130, and 140. As can be seen in FIGS. 4 and 5, spacers 120, 130, and 140 may axially displace a lubricating fluid.

Moreover, in various embodiments, the third face (e.g., 123 and 133 shown in FIG. 2) may be shaped to affect the displaced oil according to various applications. For example, in some embodiments, spacers may comprise a fluid passageway, such as fluid passageway 135. In various embodiments, fluid passageway 135 can serve to transport lubricating fluid from one end of the fuel pump to another area. Moreover, in various embodiments, the fluid passageway 135 can help alieve fluid pressure buildup in various portions along the cam shaft 110 and aid in dissipating heat.

The spacer is not particularly limited and may include various metals, alloys, plastics, and combinations thereof. Exemplary metals include aluminum, titanium, steel, alloys thereof, or combinations thereof. Various exemplary plastics include thermoplastics and thermosets. Exemplary thermoplastics include polyether ether ketones (PEEK), Polyetherketones (PEK), nylons (e.g., poly[imino(1,6-dioxohexamethylene) iminohexamethylene] or Nylon 66), or combinations thereof.

The configuration of the spacer for securing the spacer to the cam shaft 110 is not particularly limited and may include any known configuration or means for securing a spacer to a cam shaft 110. Thus, the spacer may be configured to be axially secured to the cam shaft, radially secured to the cam shaft, or combinations thereof. Exemplary methods, configurations, and means for securing the spacer to a cam shaft include bonding, welding, brazing, or soldering the spacer to the cam shaft, by placing a spacer pin into a spacer pin port of the cam shaft, by disposing a band circumferentially around a portion of the spacer and securing the band, or combinations thereof.

For example, FIG. 6 illustrates a spacer cam shaft system 600 according to various embodiments. Spacer cam shaft system 600 may include a spacer 130 with fluid passageway 135 engaged with cam shaft 110. In various embodiments, spacer 130 may be secured to cam shaft 110 with a band 610, such as a boot band, configured to engage with a third face of spacer 130 to secure the spacer to the cam shaft. In various embodiments, band 610 includes locking tabs 615.

Figure 7:
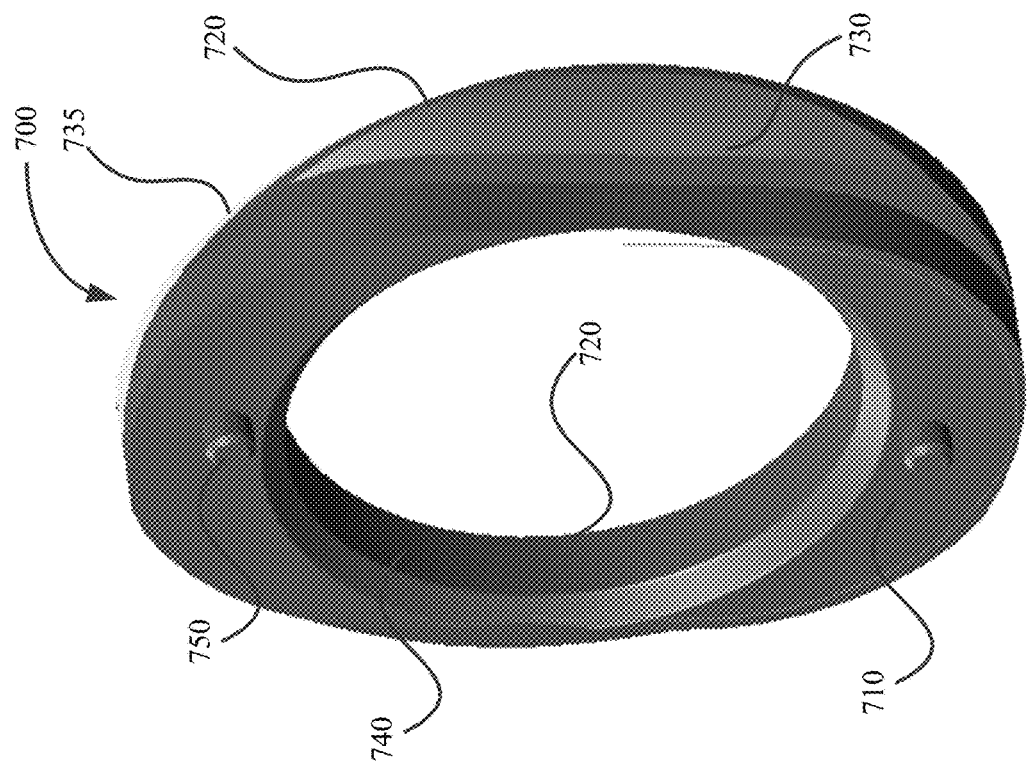
FIG. 7 is a perspective view of a spacer with a pin according to various embodiments.

With reference to FIG. 7, a spacer comprising a spacer pin is illustrated. Spacer 700 includes a first face 710, a second face 720, a third face 730 connected to the first face 710 and the second face 720, wherein the third face 730 is configured to displace a motor oil and permit rotation of the cam shaft. Moreover, spacer 700 may comprise at least one pin 750 engaged with the first face 710. In various embodiments, pin 750 may be configured to enter a spacer pin port (not shown) of the cam shaft to help secure spacer 700 to a cam shaft. In various embodiments, spacer 700 may also comprise a fourth face 740 connected to the first face 710 and the second face 720, wherein the fourth face 740 is configured to engage with a radial portion of the cam shaft 110.

Figure 8:
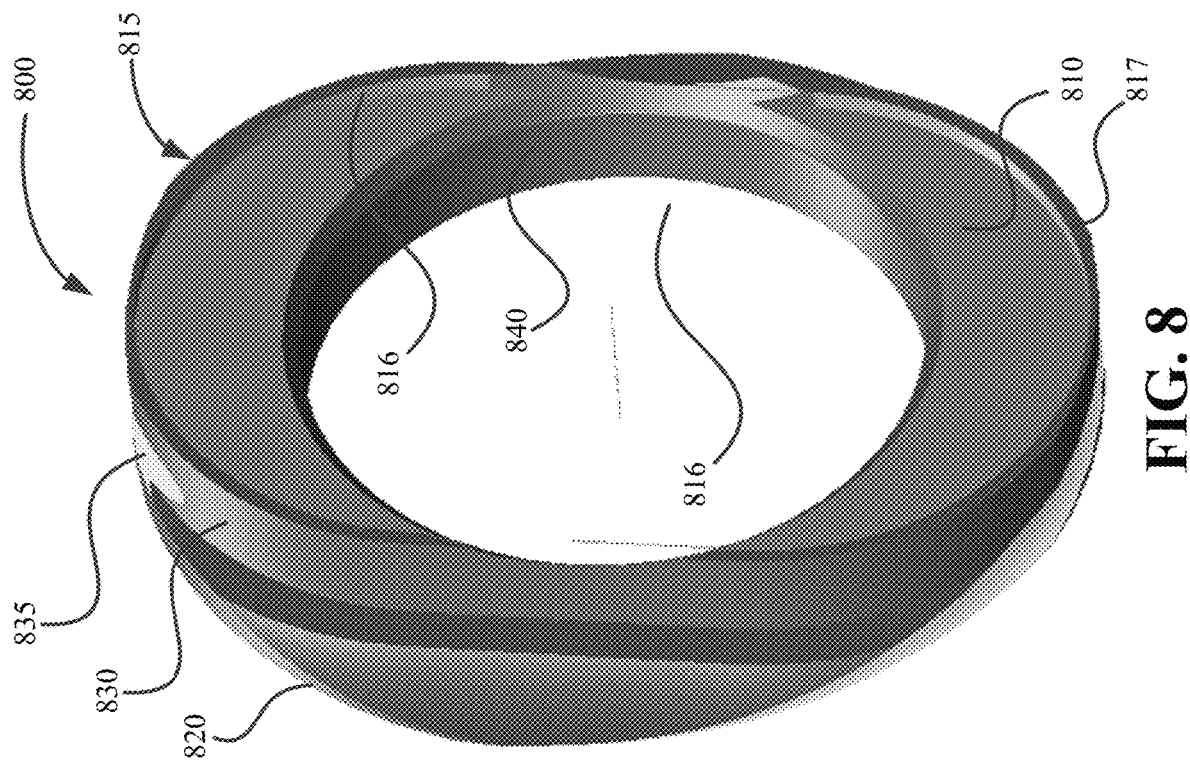
FIG. 8 is a perspective view of a spacer with a cam lobe according to various embodiments.

As yet another example, FIG. 8 illustrates a spacer 800 having a lip configured to engage with a lobe of the cam shaft. Spacer 800 includes a first face 810, a second face 820, a third face 830 connected to the first face 810 and the second face 820, wherein the third face 830 is configured to displace a motor oil and permit rotation of the cam shaft. Additionally, spacer 800 may comprise a lip 815 engaged with the first face. In various embodiments, lip 815 may comprise a first lip surface 816 and a second lip surface 817, which may help to engage the spacer to a lobe of the cam shaft 110 and allow for rotation of the cam shaft 110 when the pump is operating (e.g., while maintaining desired tappet clearances). Also, in some embodiments, a fourth face 840 may be connected to the first face 810 and the second face 810, wherein the fourth face 840 is configured to engage with a radial portion of the cam shaft 110.

Thus, spacers according to various embodiments may include a first face (e.g., 810), a second face (e.g., 820), a third face (e.g., 830) operationally coupled to the first face (e.g., 810) and the second face (e.g., 820), means for securing the spacer (e.g., 800) to a cam shaft 110, and means for permitting rotation of the cam shaft 110 while allowing for displacement of a fluid in contact with the cam shaft 110.

While this disclosure has been described as having various exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A spacer comprising:
   a first face configured to engage with a cam shaft;
   a second face; and
   a third face operationally disposed between the first face and the second face, wherein the third face is an outer radial surface of the spacer, wherein the outer radial surface includes an outer non-indented circumferential surface and an outer indented circumferential surface, and wherein the outer indented circumferential surface is a fluid passageway configured to displace a lubricating fluid and permit rotation of the cam shaft.

2. The spacer of claim 1, wherein the spacer is configured to displace the lubricating fluid between two lobes of the cam shaft.

3. A fuel pump comprising the spacer of claim 1.

4. The spacer of claim 1, further comprising a pin coupled to the first face to engage the cam shaft.

5. The spacer of claim 1, wherein the first face comprises a lip to engage a lobe of the cam shaft.

6. The spacer of claim 1, further comprising a fourth face connected to the first face and the second face, wherein the fourth face is configured to engage with a radial portion of the cam shaft.

7. The spacer of claim 6, further comprising a boot band and locking tabs, wherein the boot band is configured to engage with the third face to secure the spacer to the cam shaft.

8. The spacer of claim 1, wherein the spacer is configured to be axially secured to the cam shaft.

9. The spacer of claim 1, wherein the spacer is configured to be radially secured to the cam shaft.

10. The spacer of claim 1, wherein the spacer is bonded to the cam shaft.

11. The spacer of claim 1, wherein the spacer comprises a plastic.

12. The spacer of claim 11, wherein the plastic comprises one of polyether ether ketones (PEEK), Polyetherketones (PEK), Poly[imino(1,6-dioxohexamethylene) iminohexamethylene], and combinations thereof.

13. The spacer of claim 1, wherein the outer indented circumferential surface wraps around the outer radial surface of the spacer.

14. The spacer of claim 1, wherein the first face is operatively coupled to a first cam shaft lobe of the cam shaft.

15. The spacer of claim 14, wherein the second face is operatively coupled to a second cam shaft lobe of the cam shaft.

16. A spacer comprising:
    a first face;
    a second face;
    a third face operationally disposed between the first face and the second face;
    means for securing the spacer to a cam shaft lobe of a cam shaft; and
    the third face includes an outer non-indented circumferential surface and an outer indented circumferential surface, and wherein the outer indented circumferential surface is a fluid passageway configured to displace a fluid in contact with the cam shaft.

17. The spacer of claim 16, wherein the spacer is a plastic.

18. The spacer of claim 17, wherein the plastic comprises one of polyether ether ketones (PEEK), Polyetherketones (PEK), Poly[imino(1,6-dioxohexamethylene) iminohexamethylene], and combinations thereof.

19. The spacer of claim 16, wherein the outer indented circumferential surface wraps around the outer radial surface of the spacer.

* * * * *